United States Patent [19]

Castor

[11] Patent Number: 4,790,688

[45] Date of Patent: Dec. 13, 1988

[54] LANDFILL LEACHATE CONTROL PROCESS AND PRODUCT

[75] Inventor: Trevor P. Castor, Cambridge, Mass.

[73] Assignee: Eng, Inc., Cambridge, Mass.

[21] Appl. No.: 7,793

[22] Filed: Jan. 28, 1987

[51] Int. Cl.$^4$ .............................................. E02D 3/12

[52] U.S. Cl. ................................... 405/128; 405/263; 405/269; 166/280

[58] Field of Search ............... 405/270, 269, 267, 266, 405/128, 129, 263; 166/280

[56] References Cited

U.S. PATENT DOCUMENTS

| | | | |
|---|---|---|---|
| 1,430,306 | 9/1922 | Francois | 405/266 |
| 2,190,003 | 2/1940 | Van Hulst | 405/270 X |
| 3,097,694 | 7/1963 | Kerver | 166/280 |
| 3,323,594 | 6/1967 | Huitt et al. | 166/280 |
| 3,504,746 | 4/1970 | Freifeld et al. | 405/269 X |
| 3,608,318 | 9/1971 | Levy et al. | 405/269 X |
| 4,491,369 | 1/1985 | Cleary | 166/280 X |
| 4,527,627 | 7/1985 | Graham et al. | 166/280 |
| 4,582,452 | 4/1986 | Sabi et al. | 405/270 X |
| 4,634,187 | 1/1987 | Huff et al. | 405/128 X |
| 4,645,382 | 2/1987 | Burkhardt et al. | 405/270 X |

*Primary Examiner*—Dennis L. Taylor
*Attorney, Agent, or Firm*—Wolf, Greenfield & Sacks

[57] ABSTRACT

The invention involves the selective emplacement of an impermeable polymeric barrier in the semi-permeable substructure, faulted or fractured geologic barriers which underlie leaking waste disposal sites. The emplacement of the barrier requires the creation of a horizontal fracture below the waste disposal site and the injection of a gellable solution containing a synthetic or biologically produced polymer into the fracture. The solution is then allowed or caused to gel in situ within the subterranean formation.

A proppant may be dispersed in the gellable solution. The proppant may be a waste active material.

10 Claims, No Drawings

LANDFILL LEACHATE CONTROL PROCESS AND PRODUCT

BACKGROUND OF THE INVENTION

This invention relates in general to hazardous waste containment and in particular to selectively emplacing an impermeable polymeric barrier in the geologic substructure underlying a waste landfill to block the migration of waste from the landfill to the surrounding environment. It also relates to the polymeric barrier material itself.

A great concern exists today because hazardous wastes buried in landfills across the country are escaping into the environment. There are hundreds of hazardous waste landfills in the United States with documented leakage or concern about leakage. Known remedial measures to prevent the escape of waste from landfills are costly to implement and are of uncertain effectiveness. There is a critical need for affordable and effective techniques to seal leaking landfills and curtail continued environmental contamination.

Currently, efforts to control the escape of waste from leaking landfills include removing the waste, solidifying the waste, detoxifying the waste and containing the waste. The particular technique chosen varies necessarily with the character of the individual site. For example, thousands of pounds of toxic material are present at the S-area landfill in Niagara Falls, N.Y. Because the cost for removing these materials to another location are prohibitive, an extensive containment and treatment plan has been developed for the site. The plan calls for the installation of containment walls around the perimeter of the site from the surface down to the bedrock or clay below the waste and then for the placement of an impermeable cap over the top of the site. The perimeter walls will stop the lateral flow of waste materials out of the site while the cap will stop surface water and precipitation from percolating through the site and causing materials to leach out. The bedrock or clay base must be relied upon to arrest the downward leaching of waste materials into the groundwater containing layer.

The containment technologies available for forming vertical barriers around such sites include slurry walls, grout curtains and pilings. To be effective, the vertical barriers must be attached to a low permeability layer at the bottom. Typically the layer is the existing bedrock or clay. Sites where the bedrock or clay is fractured or is too far below the surface cannot be treated in this manner. Even where the vertical barriers are attached to a low permeability layer, concern exists regarding the effectiveness of this containment technique. Further expensive control measures are taken such as dewatering the site with collection wells and providing pumps along the perimeter walls to induce the flow of ground water up through the underlying strata of the site to stop any flow of contaminated water out of the landfill area. Furthermore, comprehensive monitoring activity typically is conducted to detect failure of the system. To date, no adequate technique for sealing the entire base of a landfill site has been developed.

OBJECT OF THE INVENTION

It is an object of the invention to provide a method for preventing the migration of waste from a waste landfill into the surrounding environment.

Another object of the invention is to provide a horizontally oriented impermeable barrier beneath a leaky waste landfill.

Another object of the invention is to provide a toxic waste containment barrier that is more effective and less expensive than known barriers.

Still another object of the invention is to provide a product capable of being used to fracture geologic subterranean strata, which product is capable of forming an impermeable barrier and immobilizing toxic elements with which it is contacted.

SUMMARY OF THE INVENTION

The invention, a landfill leakage control treatment (LLCT), involves the selective emplacement of an impermeable polymeric barrier in the geologic barriers which underlie leaking waste disposal sites. The barrier prevents the migration of waste from the landfill or waste disposal site to the surrounding environment.

A gellable solution is selected which in its gelled state is impermeable to and resistant to degradation by the waste. The gellable solution contains a polymer, cross-linking agent and fracturing proppant. The solution is injected into the landfill base at a pressure sufficient to create a horizontal fracture of between about 0.1 inch and 2.0 inches thick. Preferably the pressure is between about 0.3 and 1.0 psi per foot of depth of the intended fracture. Several of these injections may be made in order to create an entire base where each injection covers an area with a radius of between about 50 and 1000 feet. The solution then is caused or allowed to gel by the action of a cross-linking agent thereby forming an impermeable barrier. The cross-linking of the polymer in the solution may be accomplished by the addition of multivalent metal cations which are capable of cross-linking the polymers.

The viscosity of the solution before a selected proppant is added is low enough (preferably from about 5 to 30 centipoise) so that the solution will penetrate any barriers which have not been fractured and will penetrate through the fracture faces of the treated area. Preferably the viscosity and pressure are such that the solution will penetrate the faces of the fracture to between about 0.5 and 2 feet.

The proppant may be a conventional proppant such as sand or glass beads. Preferably the proppant is waste active, such as an ionic exchange compound capable of complexing with and immobilizing the waste if the waste contacts it. The proppant preferably has a size of between about 10 and 40 mesh.

The invention also provides a product for forming a barrier to prevent the migration of waste from a landfill to the surrounding environment. A proppant is dispersed in a gellable solution which solution in a gelled state is impermeable to and resistant to degradation by waste. The proppant may be a waste active material, such as one that is capable of complexing with and immobilizing the waste when the waste contacts it.

DETAILED DESCRIPTION OF THE PREFERRED EMBODIMENTS

The invention may be used to prevent the escape of waste from leaky landfill sites, leaking above-ground and underground storage tanks, spills and dumps of hazardous waste, lagoons which store waste chemicals and other toxic materials, and mill tailings which constitute either a heavy metal or low-level radioactivity contamination problem. These will be referred to generically as waste disposal sites.

The invention involves the selective emplacement of an impermeable polymeric barrier in the semi-permeable substructure, faulted or fractured geologic barriers which underlie leaking waste disposal sites. The emplacement of the barrier requires the creation of a horizontal fracture below the waste disposal site and the injection of a gellable solution containing a synthetic or biologically produced polymer into the fracture. The solution is then allowed or caused to gel in situ within the subterranean formation.

By impermeable it is meant that the gel is sufficiently impermeable to perform its intended function, that is, to prevent the escape of waste from the waste disposal site through the gel. For example, the gel may be impermeable to the toxic species itself, be impermeable to the toxic species carrier, or both.

The pancake-like horizontal fracture is created by a technique called "hydraulic fracturing". Hydraulic fracturing, a commercially available and widely used technology in the petroleum industry, can be described as the process of creating a fracture or fracture system in a porous medium by injecting fluid under pressure through a wellbore in order to overcome native stresses and to cause material failure of the porous medium. The injection pressures must be high enough to overcome the earth's stresses, usually between about 0.3 and 1.0 psi/ft of depth of intended fracture, and any frictional losses in the pumping system and the injection string.

The planar orientation of the fracture depends on the depth of the fracture zone since the "frac" is created perpendicular to the plane of maximum principal stress. A barrier beneath a waste disposal site typically would be placed at a depth of less than about 1,000 ft. At such shallow depths, the created fracture will most probably be horizontal since the stress in this plane is less than that in the vertical plane. In a shallow fracture, the earth's overburden is actually lifted. The propagation of the fracture is usually symmetrical; the extent of the fracture depends in part on the rate and volume of fluid injected, and the fluid loss properties of the fractured zone, i.e., the extent of the fracture depends in part on the net rate and volume of fluid injected into the created fracture.

On release of injection pressure, fracture conductivity can be maintained by the simultaneous injection of sufficient quantities of a proppant within the fracture fluid. The proppant is a solid material whose presence maintains the fracture by preventing the fracture faces from coming together or "healing" when the pressure gradient is released. The proppant usually is suspended in the fracture fluid prior to injecting the fluid to create the fracture. The propped zone typically is between about 0.10" and 0.25" thick after release of the fracture pressure gradient.

Preferably the barrier forming solution is used as the fracturing fluid. The solution then serves not only as the barrier forming material but also as the fracturing fluid, as well as the suspensioning agent for the proppant. It also is preferable that the barrier solution contain gelling agents added prior to injection of the barrier solution such that the barrier solution will gel after it is injected into the subterranean formation without further treatment. The gellation time can be varied from a few minutes to a few days.

To form a polymeric barrier beneath a waste disposal site, the barrier solution, including a polymer, a gelling agent and proppant, is injected into the geologic base of the waste site at a pressure sufficient to create a horizontal fracture. Preferably the pressure is between about 0.3 and 1.0 psi per foot of depth of intended horizontal fracture. Several injections may be made where the base of the waste disposal site is large, as each fracture will cover an area having a radius of between about 50 and 1,000 feet.

Upon release of the surface pressure, the formation will self-heal onto the mixture of polymeric solution, cross-linkers and proppants resulting in an impermeable barrier upon gellation of the mixture. The cased injection then will be plugged with cement above the fractured zone.

The selection of a suitable barrier solution and gelling agent will depend largely on the soil characteristics of the landfill base and the characteristics of the wastes in the landfill. The gelled solution must be impermeable to and resistant to degradation by the toxic waste leachates. The major degradation mechanisms are ionic degradation, microbial decomposition, dissolution effects, nucleophillic attacks, thermal alteration of reaction kinetics, mechanical shear stressing and hydration or aqueous phase swelling. In addition to degradation of the gel, the in situ gelling or cross-linking of the barrier solution may be impaired in the presence of toxic waste leachates. However, this process weakness will be averted for the most part in the preferred embodiment where the barrier solution incorporates a clean, well sorted proppant.

Polymers which are at least applicable for use in this invention include polyacrylamides, partially hydrolyzed polyacrylamides, polyacrylonitrile, polyacrylic acid, polyvinylpyrolidine, polysaccharides, carboxymethyl cellulose, other substituted celluloses, polyvinyl alcohol, polystyrene sulfonates, copolymers of acrylamide and acrylic acid or 2-acrylamide-methyl-1-propane sulfonic acid. The concentration of the polymer in the injections will be between about 1,000 ppm to about 40,000 ppm, more preferably from about 5,000 to about 30,000 ppm.

Polyacrylamide gel systems are relatively stable in the presence of strong nucleophiles, organic solvents, hydrating agents, and inorganic salts. Polyacrylamides have excellent compatibility with oily wastes and appear to have poor stability in the presence of strong bases, strong acids, inorganic solvents and dehydrating agents. Polysaccharide gel systems are relatively stable in the presence of strong nucleophiles and have excellent compatibility with organic solvents and oil wastes. However, they have poor stability in the presence of hydrating agents, inorganic solvents, strong bases and strong acids, except for hydrochloric acid which appears to strengthen some polysaccharide gel systems.

Polymers that may be particularly suitable for use in the invention are poly N-VINYL PYRROLIDONE (PVP), sulfonated aromatic/aliphatic copolymers, phenol-formaldehyde polymers and their derivatives (phenolics), and polysiloxanes. PVP has resistance to salts, acids and thermal degradation. Sulfonated aromatic aliphatic copolymers are inert toward acids and bases and exhibit good thermal stability. Phenolics exhibit excellent thermal stability and resistance to hydrolytic degradation. Polysiloxanes exhibit good thermal stability, resistance to chemical degradation and bacterial and fungal growth.

The gelling agent selected will depend in part upon the polymer selected for the barrier solution, the soil conditions and the amount of delay between injection and gelling that is desired. Suitable polymer cross linking agents include multivalent metal cations such as $Fe+2$, $Fe+3$, $Al+3$, $Ti+4$, $Sn+4$, $Ca+2$, $Mg+2$, and $Cr+3$. Gelling control may be accomplished through the catalytic release of the cross-linking agent. For example, redox reactions controlling the release of the cross-linking agent have been used successfully in the oil industry. The cross-linking agent preferably is present in an amount of about 50 to about 200 percent of the stoichiometric amount required to completely cross-link the amount of polymer used, and most preferably 100 to about 150 percent of the stoichiometric amount required to completely cross-link the amount of polymer used. Excess heavy metal ion cross-linking agent may itself be a waste problem and should be avoided since unreacted toxic ions may leach from the gel.

The viscosity of the barrier solution before proppant is added should be low enough so that the solution will penetrate the areas which have not been fractured and will penetrate through the face of the fracture so that the treated area will extend to between about 0.5 and 2.0 feet in thickness. Such a viscosity also allows the filling of void spaces, vugs, fissures and any offsetting fractures extending from the fracture face. The barrier solution also should be of sufficient viscosity to support the proppant. Preferably the viscosity of the solution before adding the proppant is between about 1 and 5 centipoise.

The proppant may be any conventional proppant or mixture thereof and preferably is of a size between about 10 and 40 mesh. The amount of proppant required will vary with the particular site conditions and the particular barrier material selected. For example, the depth of the intended fracture, the viscosity of the barrier solution and the cross linking agent selected all may influence the preferred amount of proppant. Preferably the amount of proppant is sufficient to maintain the fracture space permeable to fluids.

Preferably the proppant is sand, glass beads, or a waste active material. For example, the proppant may be an ion exchange compound such as polystyrene. When an ion exchange compound is used as the proppant, the gel will have the ability to immobilize certain toxic leachates that contact or penetrate the barrier gel. Other suitable waste active materials include absorbants, molecular sieves and molecular exclusion or entrapment materials.

EXAMPLE 1

For waste sites containing organic solvents and oily wastes and for those waste sites containing dilute inorganics at a barrier contact pH greater than 4.0 and less than 10.0, polyacrylamide gels cross-linked with aluminum citrate are preferred. The solution polymer (e.g. American Cyanamid's Cyanagel 100 polyacrylamide) is first mixed in fresh water with an electrolyte (e.g. NaCl or KCl) concentration between 0 and 10,000 ppm so that the active polymer concentration lies within the range of 2.5 to 6.5 wt percent with an optimum of 6.0 wt percent. The solution should not be excessively sheared to prevent mechanical shear degradation. To the solution is added 200 to 3,000 ppm aluminum citrate with an optimum of 2,700 ppm, depending on the design of the treatment. The pH of the mixture is adjusted to between 3.5 and 6.5, with an optimum around 6.0. This bulk phase mixture is then emplaced below the active waste site at a rate of between about 1 to about 100 barrels per minute with an optimum around 10 barrels per minute and allowed to gel in situ. The gellation time will vary from 15 minutes to as much as four days depending on the concentrations of chemicals used, the nature of the site, and the temperature at the subterranean point of emplacement.

EXAMPLE 2

For sites with soils contaminated with toxic wastes such as heavy metal ions, a proppant such as sand in the 10-40 mesh size range is added to a bulk phase mixture such as the polymer/ion solution of Example 1 during injection of the bulk phase mixture so that the proppant concentration lies in the range of 0.2 lbs/gal to 2.2 lbs/gal depending on the viscosity of the gel solution at the time of injection.

It should be understood, however, that the foregoing description of the invention is intended merely to be illustrative thereof and that other embodiments and modifications may be apparent to those skilled in the art without departing from its spirit.

Having thus described the invention, what I desire to claim and secure by Letters Patent is:

1. A method for treating the geologic base of a waste landfill to prevent the migration of waste from the landfill to the surrounding environment comprising:
   selecting a gellable solution which in a gelled state is impermeable to and resistant to degradation by said waste, said gellable solution including a waste-active material capable of acting on the waste in the landfill,
   creating a fracture in said geologic base,
   filling said fracture with said gellable solution, and
   allowing or causing said gellable solution to gel thereby forming an impermeable barrier beneath the waste for blocking the migration of waste from the landfill.

2. A method as claimed in claim 1 wherein said gellable solution comprises a polymer in said solution, and said gellable solution is gelled within said fracture by cross-linking said polymer with a cross-linking agent.

3. A method as claimed in claim 2 further comprising introducing a proppant into said fracture space prior to said gel forming.

4. A method as claimed in claim 3 wherein said gellable solution has a viscosity sufficient to support said proppant, said proppant is dispersed in said gellable solution prior to creating said fracture, and said gellable solution and said proppant are introduced into said fracture simultaneously.

5. A method as claimed in claim 3 wherein said proppant is a waste active material.

6. A method as claimed in claim 5 wherein said proppant is selected from the group consisting of an ion exchange material and absorbent.

7. A method as claimed in claim 6 wherein said polymer in gellable solution is selected from the group consisting of polyacrylamides, polysaccharides, PVP, sulfonated aromatic/aliphatic copolymers, phenolics and polysiloxanes.

8. A product useful in forming a barrier to prevent the migration of waste from a landfill to the surrounding environment comprising:
   a gellable solution which in a gelled state is impermeable to and resistant to degradation by said waste,
   a waste-active material selected from the group of materials consisting of ion exchange materials and absorbent materials, and a selected proppant dispersed in said gel, said proppant having the ability to fill a fracture space and maintain said fracture space permeable to fluids.

9. A product as claimed in claim 8 wherein said proppant is said waste active material.

10. A product as claimed in claim 9 wherein said proppant is polystyrene.

* * * * *